(12) United States Patent
Kliper

(10) Patent No.: US 10,825,069 B2
(45) Date of Patent: Nov. 3, 2020

(54) SYSTEM AND METHOD FOR INTUITIVE CONTENT BROWSING

(71) Applicant: The Joan and Irwin Jacobs Technion-Cornell Institute, New York, NY (US)

(72) Inventor: Roi Kliper, New York, NY (US)

(73) Assignee: THE JOAN AND IRWIN JACOBS TECHNION-CORNELL INSTITUTE, New York, NY (US)

( * ) Notice: Subject to any disclaimer, the term of this patent is extended or adjusted under 35 U.S.C. 154(b) by 153 days.

(21) Appl. No.: 15/404,827

(22) Filed: Jan. 12, 2017

(65) Prior Publication Data

US 2017/0124622 A1     May 4, 2017

Related U.S. Application Data

(63) Continuation-in-part of application No. 14/940,396, filed on Nov. 13, 2015, now Pat. No. 10,460,286.
(Continued)

(51) Int. Cl.
*G06Q 10/08* (2012.01)
*G06Q 30/06* (2012.01)
(Continued)

(52) U.S. Cl.
CPC ..... *G06Q 30/0625* (2013.01); *G06F 16/9577* (2019.01); *G06Q 10/087* (2013.01);
(Continued)

(58) Field of Classification Search
CPC . G06F 3/048; G06F 17/30; G06F 7/00; G06F 3/14; G06F 7/06; G02B 27/01; G09G 3/00; G06Q 30/0625
(Continued)

(56) References Cited

U.S. PATENT DOCUMENTS 6,326,988 B1   12/2001   Gould et al.
6,868,525 B1    3/2005   Szabo
(Continued)

FOREIGN PATENT DOCUMENTS

WO      2000062172 A1    10/2000

OTHER PUBLICATIONS

The International Search Report and the Written Opinion for PCT/US2017/013175, dated Apr. 27, 2017, ISA/RU, Moscow, Russia.
(Continued)

*Primary Examiner* — Oluseye Iwarere
(74) *Attorney, Agent, or Firm* — M&B IP Analysts, LLC.

(57) ABSTRACT

A method and system for intuitive content browsing. The method includes determining, based on a request to browse content, an initial focal point for a visual representation of the content, wherein the initial focal point represents a content item; identifying, based on the request and the determined initial focal point, the content to be browsed; generating, based on the identified content and the focal point, a visual representation of the identified content, wherein the generated visual representation includes the identified content organized with respect to the initial focal point; and sending, to a user device, the generated visual representation for display, wherein the identified content is browsed via the displayed visual representation with respect to the focal point.

19 Claims, 5 Drawing Sheets

Related U.S. Application Data

(60) Provisional application No. 62/279,125, filed on Jan. 15, 2016, provisional application No. 62/147,771, filed on Apr. 15, 2015, provisional application No. 62/079,804, filed on Nov. 14, 2014.

(51) Int. Cl.
*G06F 16/957* (2019.01)
*G06Q 20/20* (2012.01)
*G06Q 20/12* (2012.01)
*G06F 3/0485* (2013.01)
*G06F 3/0481* (2013.01)

(52) U.S. Cl.
CPC .............. *G06Q 20/12* (2013.01); *G06Q 20/20* (2013.01); *G06Q 20/202* (2013.01); *G06Q 30/0641* (2013.01); *G06F 3/0485* (2013.01); *G06F 3/04817* (2013.01)

(58) Field of Classification Search
USPC .............. 715/764, 747, 847; 707/709; 345/8
See application file for complete search history.

(56) References Cited

U.S. PATENT DOCUMENTS

| | | | |
|---|---|---|---|
| 7,010,577 B1 | 3/2006 | Philyaw et al. | |
| 7,027,999 B2 | 4/2006 | Smith et al. | |
| 7,685,192 B1* | 3/2010 | Scofield | G06F 17/30873 |
| | | | 707/709 |
| 7,747,749 B1* | 6/2010 | Erikson | G06F 16/9574 |
| | | | 709/226 |
| 7,975,019 B1 | 7/2011 | Green et al. | |
| 8,010,901 B1* | 8/2011 | Rogers | G06F 16/954 |
| | | | 715/751 |
| 8,170,927 B2 | 5/2012 | Godlewski | |
| 8,244,590 B2 | 8/2012 | Rothman | |
| 8,352,869 B2* | 1/2013 | Melcher | G06F 17/30873 |
| | | | 715/747 |
| 8,401,911 B1 | 3/2013 | Chu et al. | |
| 8,631,029 B1* | 1/2014 | Amacker | G06F 17/30554 |
| | | | 707/766 |
| 8,682,739 B1 | 3/2014 | Feinstein | |
| 8,813,132 B2 | 8/2014 | Andrews et al. | |
| 9,285,958 B1* | 3/2016 | Hill | G06F 3/0483 |
| 9,319,745 B2 | 4/2016 | Rankine | |
| 9,430,784 B1 | 8/2016 | Frederick et al. | |
| 9,569,806 B2 | 2/2017 | Mirrashidi et al. | |
| 9,933,864 B1* | 4/2018 | Worland | G06F 3/0346 |
| 9,978,078 B2 | 5/2018 | Georgoff et al. | |
| 10,062,103 B2 | 8/2018 | Wantz et al. | |
| 10,121,163 B2 | 11/2018 | Salari | |
| 2001/0054008 A1 | 12/2001 | Miller et al. | |
| 2002/0059117 A1 | 5/2002 | Yoch et al. | |
| 2002/0143659 A1 | 10/2002 | Keezer et al. | |
| 2002/0143669 A1 | 10/2002 | Scheer | |
| 2003/0101413 A1 | 5/2003 | Klein et al. | |
| 2004/0030741 A1* | 2/2004 | Wolton | G06F 17/30873 |
| | | | 709/202 |
| 2004/0075685 A1* | 4/2004 | Ohyama | G06Q 10/06 |
| | | | 715/745 |
| 2005/0097005 A1 | 5/2005 | Fargo | |
| 2005/0165766 A1* | 7/2005 | Szabo | G06F 17/30067 |
| 2005/0187967 A1 | 8/2005 | Couch et al. | |
| 2006/0004914 A1 | 1/2006 | Kelly et al. | |
| 2006/0100924 A1 | 5/2006 | Tevanian | |
| 2007/0100799 A1* | 5/2007 | Rose | G06F 17/30395 |
| 2007/0100802 A1 | 5/2007 | Celik | |
| 2007/0156677 A1* | 7/2007 | Szabo | G06F 17/30522 |
| 2007/0208719 A1* | 9/2007 | Tran | G06F 17/30864 |
| 2007/0244831 A1 | 10/2007 | Kuo | |
| 2007/0250901 A1 | 10/2007 | McIntire et al. | |
| 2007/0300142 A1 | 12/2007 | King et al. | |
| 2008/0010120 A1 | 1/2008 | Chung et al. | |
| 2008/0091526 A1* | 4/2008 | Shoemaker | G06Q 20/10 |
| | | | 705/14.55 |
| 2008/0092054 A1* | 4/2008 | Bhumkar | G06F 3/0482 |
| | | | 715/739 |
| 2008/0163379 A1 | 7/2008 | Robinson et al. | |
| 2008/0209308 A1 | 8/2008 | Brackney | |
| 2008/0253739 A1 | 10/2008 | Livesey | |
| 2008/0294974 A1* | 11/2008 | Nurmi | G06F 16/9577 |
| | | | 715/204 |
| 2008/0313108 A1* | 12/2008 | Carrabis | A61B 5/16 |
| | | | 706/11 |
| 2009/0034784 A1 | 2/2009 | McQuaide | |
| 2009/0148045 A1 | 6/2009 | Lee et al. | |
| 2009/0198767 A1* | 8/2009 | Jakobson | G06F 16/951 |
| | | | 709/203 |
| 2009/0248548 A1 | 10/2009 | Obermeyer | |
| 2009/0259632 A1* | 10/2009 | Singh | G06F 16/951 |
| 2009/0271250 A1 | 10/2009 | Sriver et al. | |
| 2009/0271289 A1 | 10/2009 | Klinger et al. | |
| 2009/0276805 A1 | 11/2009 | Andrews, II et al. | |
| 2009/0281899 A1 | 11/2009 | Jiang | |
| 2009/0300528 A1* | 12/2009 | Stambaugh | G06F 3/04817 |
| | | | 715/764 |
| 2010/0153831 A1 | 6/2010 | Beaton | |
| 2010/0169766 A1* | 7/2010 | Duarte | G06F 3/04842 |
| | | | 715/244 |
| 2010/0185525 A1 | 7/2010 | Hazen et al. | |
| 2010/0205541 A1* | 8/2010 | Rapaport | G06Q 10/10 |
| | | | 715/753 |
| 2010/0332496 A1 | 12/2010 | Horvitz et al. | |
| 2011/0004517 A1 | 1/2011 | Soto et al. | |
| 2011/0010245 A1 | 1/2011 | Priebatsch et al. | |
| 2011/0016021 A1 | 1/2011 | Manning | |
| 2011/0025694 A1* | 2/2011 | Ptucha | G06T 11/60 |
| | | | 345/467 |
| 2011/0025709 A1* | 2/2011 | Ptucha | G06T 11/60 |
| | | | 345/629 |
| 2011/0035275 A1 | 2/2011 | Frankel et al. | |
| 2011/0099088 A1 | 4/2011 | Berrios et al. | |
| 2011/0131235 A1* | 6/2011 | Petrou | G06F 17/30277 |
| | | | 707/769 |
| 2011/0131241 A1* | 6/2011 | Petrou | G06F 17/30861 |
| | | | 707/770 |
| 2011/0238474 A1 | 9/2011 | Carr et al. | |
| 2011/0276915 A1* | 11/2011 | Freire | G06Q 10/00 |
| | | | 715/772 |
| 2011/0298830 A1* | 12/2011 | Lam | G06F 3/04883 |
| | | | 345/661 |
| 2011/0313856 A1 | 12/2011 | Cohen et al. | |
| 2012/0016780 A1 | 1/2012 | Lee et al. | |
| 2012/0095881 A1 | 4/2012 | Rothman | |
| 2012/0167146 A1 | 6/2012 | Incorvia | |
| 2012/0179556 A1 | 7/2012 | Ertas | |
| 2012/0185803 A1* | 7/2012 | Wang | G06F 3/04817 |
| | | | 715/847 |
| 2012/0203661 A1 | 8/2012 | Baharloo et al. | |
| 2012/0206647 A1 | 8/2012 | Allsbrook et al. | |
| 2012/0220346 A1* | 8/2012 | Yu | G06F 16/9577 |
| | | | 455/566 |
| 2012/0311453 A1* | 12/2012 | Reyna | G06Q 30/0257 |
| | | | 715/738 |
| 2013/0138510 A1 | 5/2013 | Carnevali | |
| 2013/0282520 A1 | 10/2013 | Tapley et al. | |
| 2013/0283200 A1 | 10/2013 | Steelberg et al. | |
| 2013/0290149 A1 | 10/2013 | Rashwan | |
| 2013/0325319 A1* | 12/2013 | Moore | G01C 21/36 |
| | | | 701/412 |
| 2013/0325644 A1 | 12/2013 | Sivaraman | |
| 2013/0332262 A1 | 12/2013 | Hunt et al. | |
| 2014/0019266 A1 | 1/2014 | Stoliartchouk et al. | |
| 2014/0032518 A1* | 1/2014 | Cohen | G06F 17/30598 |
| | | | 707/706 |
| 2014/0040027 A1 | 2/2014 | Anderson et al. | |
| 2014/0046789 A1 | 2/2014 | Baliga | |
| 2014/0058850 A1 | 2/2014 | Reckert et al. | |
| 2014/0129919 A1 | 5/2014 | Benson | |

(56) References Cited

U.S. PATENT DOCUMENTS

| | | | |
|---|---|---|---|
| 2014/0164913 A1* | 6/2014 | Jaros | G06F 17/212 |
| | | | 715/243 |
| 2014/0168076 A1* | 6/2014 | Hicks | G06F 3/0488 |
| | | | 345/157 |
| 2014/0180832 A1 | 6/2014 | Fox et al. | |
| 2014/0184475 A1* | 7/2014 | Tantos | H03M 13/356 |
| | | | 345/8 |
| 2014/0200998 A1 | 7/2014 | Olliphant et al. | |
| 2014/0229270 A1 | 8/2014 | Rashwan | |
| 2015/0062121 A1* | 3/2015 | Karakotsios | G06T 3/60 |
| | | | 345/419 |
| 2015/0091906 A1* | 4/2015 | Dishno | G06F 16/954 |
| | | | 345/427 |
| 2015/0112790 A1 | 4/2015 | Wolinsky et al. | |
| 2015/0120453 A1 | 4/2015 | Lee et al. | |
| 2015/0154689 A1 | 6/2015 | Fitzpatrick | |
| 2015/0178786 A1 | 6/2015 | Claessens | |
| 2015/0227972 A1 | 8/2015 | Tang | |
| 2015/0294377 A1* | 10/2015 | Chow | G06Q 30/0263 |
| | | | 705/347 |
| 2015/0302011 A1 | 10/2015 | Ochiai | |
| 2015/0302424 A1 | 10/2015 | Akbarpour et al. | |
| 2015/0326925 A1 | 11/2015 | Ozkan | |
| 2015/0332385 A1 | 11/2015 | Hogg et al. | |
| 2015/0350729 A1 | 12/2015 | Reynolds | |
| 2015/0379615 A1 | 12/2015 | Dhar et al. | |
| 2016/0012142 A1* | 1/2016 | Reed | G06F 16/9566 |
| | | | 707/722 |
| 2016/0049007 A1* | 2/2016 | Mullins | G06T 19/006 |
| | | | 345/419 |
| 2016/0133055 A1* | 5/2016 | Fateh | G06F 3/147 |
| | | | 345/633 |
| 2016/0133170 A1* | 5/2016 | Fateh | G06F 3/147 |
| | | | 345/428 |
| 2016/0140532 A1 | 5/2016 | Kliper et al. | |
| 2016/0148304 A1 | 5/2016 | Srinath et al. | |
| 2016/0225045 A1 | 8/2016 | Cumberland et al. | |
| 2016/0267569 A1 | 9/2016 | Hampson et al. | |
| 2017/0013072 A1* | 1/2017 | Liang | H04L 67/22 |
| 2017/0078447 A1* | 3/2017 | Hancock | H04L 67/38 |
| 2017/0116640 A1 | 4/2017 | Sah et al. | |
| 2017/0200141 A1 | 7/2017 | Pattajoshi | |
| 2018/0225885 A1* | 8/2018 | Dishno | G06F 16/9577 |

OTHER PUBLICATIONS

Patent Cooperation Treaty the International Search Report and the Written Opinion of the International Searching Authority for PCT/US2015/060533, ISA/RU, Moscow, Russia, dated Feb. 25, 2016.

Patent Cooperation Treaty Written Opinion of the International Searching Authority for PCT/US2015/060609, ISA/RU, Moscow, Russia, dated Feb. 11, 2016.

\* cited by examiner

SYSTEM AND METHOD FOR INTUITIVE CONTENT BROWSING

CROSS-REFERENCE TO RELATED APPLICATIONS

This application claims the benefit of U.S. Provisional Application No. 62/279,125 filed on Jan. 15, 2016. This application is also a continuation-in-part of U.S. patent application Ser. No. 14/940,396 filed on Nov. 13, 2015. The Ser. No. 14/940,396 Application claims the benefit of U.S. Provisional Application No. 62/147,771 filed on Apr. 15, 2015, and of U.S. Provisional Application No. 62/079,804 filed on Nov. 14, 2014. The contents of the above-referenced applications are hereby incorporated by reference.

TECHNICAL FIELD

The present disclosure relates generally to displaying content, and more particularly to intuitively organizing content to allow for interactions in two-dimensional and three-dimensional space.

BACKGROUND

As the Internet becomes increasingly prevalent in modern society, the amount of information available to the average user has increased astronomically. Consequently, systems for retrieving and browsing web-based content are used much more frequently. Such systems often accept a user query for content to browse in the form of, for example, text, multimedia content (an image, videos, audio), and so on. The widespread availability of new content has led to further developments of display mechanisms allowing users to consumer and interact with data. For example, touch screens allowing users to intuitively interact with displayed content and three-dimensional virtual reality displays allowing users to view content in an immersive environment have become available to the average person. These evolving display mechanisms provide varied and improved user experiences as time goes on.

To obtain relevant content, user queries must contain sufficient information to identify relevant material. Although algorithms used in tandem with, e.g., search engines, have been developed to provide a much greater likelihood of finding relevant content for even basic queries, users may nevertheless face challenges in accurately finding particularly relevant content due to the arcane rules utilized in accepting user queries. For example, users can find more accurate content using logical operators that may not be known or understood by the average person.

The challenges in utilizing existing content retrieval systems cause further difficulties for users seeking to refine queries. Refinement may include submitting a refined query to the retrieval system and receiving new results respective of the refined query, thereby effectively submitting a new search. As a result, refinement wastes time and computing resources due to the submission of additional queries, even for users that are familiar with the idiosyncrasies of web-based content searches. Further, inexperienced users may be frustrated by the inability to properly refine their searches to obtain the desired results.

As an example, a user living in New York City seeking to purchase wine may submit a query of "wine." Upon viewing search results related to wine generally, the user may wish to refine his search to focus on red wine and, as a result, enters a refined query of "red wine." The user may wish to further refine his search to focus on red wine originating from France and, thus, enter a refined query of "red wine France." The results of this search may include content related red wine being sold in France and/or to red wine originating from France being sold anywhere in the world. The user may further need to refine his search on French red wine that can be bought locally and, therefore, enter a further refined query of "red wine France in New York." Each of the refinements requires the user to manually enter a refined query and submit the query for a new search, thereby wasting the user's time and unnecessarily using computing resources.

Existing solutions for refining content queries often involve offering predetermined potential refined queries and directing users to content upon user interactions with the potential refined queries. The potential refined queries may be based on, e.g., queries submitted by previous users. However, previous user queries do not always accurately capture a user's current needs, particularly when the user is not aware of his or her needs. For example, a user seeking to buy chocolate may initially enter the query "chocolate" before ultimately deciding that she would like to buy dark chocolate made in Zurich, Switzerland. Potential refinements offered based on the initial query may include "dark chocolate," "white chocolate," "milk chocolate," and "Swiss chocolate," none of which entirely captures the user's ultimate needs. Thus, the user may need to perform several refinements and resend queries multiple times before arriving at the desired content.

Moreover, for users seeking to purchase products, it may be difficult to determine in which stores the products are physically available. To find such information, a user may need to visit e-commerce websites of stores until he or she finds a store that lists the item as "in stock." Nevertheless, such listings may be outdated or otherwise inaccurate, thereby causing user frustration and a need to conduct further searches.

Further, when viewing search results or otherwise viewing content, the user is typically presented with display options such as organizing content in various organizational schemes (e.g., list form, grid form, and so on) and/or based on different ordering schemes (e.g., by date or time, relevancy to a query, alphabetical order, and so on). For example, a user viewing content related to a particular book may wish to view content related to books by the same author, about the same subject, from the same genre or literary era, and so on. To view this additional content, users may be able to reorganize displayed content by, e.g., changing the organizational scheme, submitting refinement queries, changing the ordering scheme, and so on.

To this end, it is desirable to provide content in ways that are intuitive and therefore easily digestible by the average user. Intuitive content organization and navigation therefore serve an important role in improving the overall user experience by increasing user engagement and allowing for more efficient retrieval and/or viewing of content. Such improvements to user experience may be particularly important in the search engine context, as improved user experience may result in increased use of search engine services and/or purchases of products.

Additionally, some solutions exist for allowing users to browse stores remotely via remoted controlled on premises cameras (i.e., disposed in the store) or preexisting (e.g., static) photos or images of the premises and inventory. These solutions allow users to intuitively engage with content as they would in a physical store, but are typically limited to displaying store contents as they were previously (based on previously captured images) or as they currently are (e.g., via live video feed or images otherwise captured in real-time), but not based on potential future configurations (e.g., based on predicted inventories and other future changes).

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for intuitive content browsing. The method includes determining, based on a request to browse content, an initial focal point for a visual representation of the content, wherein the initial focal point represents a content item; identifying, based on the request and the determined initial focal point, the content to be browsed; generating, based on the identified content and the focal point, a visual representation of the identified content, wherein the generated visual representation includes the identified content organized with respect to the initial focal point; and sending, to a user device, the generated visual representation for display, wherein the identified content is browsed via the displayed visual representation with respect to the focal point.

Certain embodiments disclosed herein also include a non-transitory computer readable medium having stored thereon instructions for causing a processing circuitry to perform a process, the process comprising: determining, based on a request to browse content, an initial focal point for a visual representation of the content, wherein the initial focal point represents a content item; identifying, based on the request and the determined initial focal point, the content to be browsed; generating, based on the identified content and the focal point, a visual representation of the identified content, wherein the generated visual representation includes the identified content organized with respect to the initial focal point; and sending, to a user device, the generated visual representation for display, wherein the identified content is browsed via the displayed visual representation with respect to the focal point.

Certain embodiments disclosed herein also include a system for intuitive content browsing. The system comprises: a processing circuitry; and a memory, the memory containing instructions that, when executed by the processing circuitry, configure the system to: determine, based on a request to browse content, an initial focal point for a visual representation of the content, wherein the initial focal point represents a content item; identify, based on the request and the determined initial focal point, the content to be browsed; generate, based on the identified content and the focal point, a visual representation of the identified content, wherein the generated visual representation includes the identified content organized with respect to the initial focal point; and send, to a user device, the generated visual representation for display, wherein the identified content is browsed via the displayed visual representation with respect to the focal point.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1:
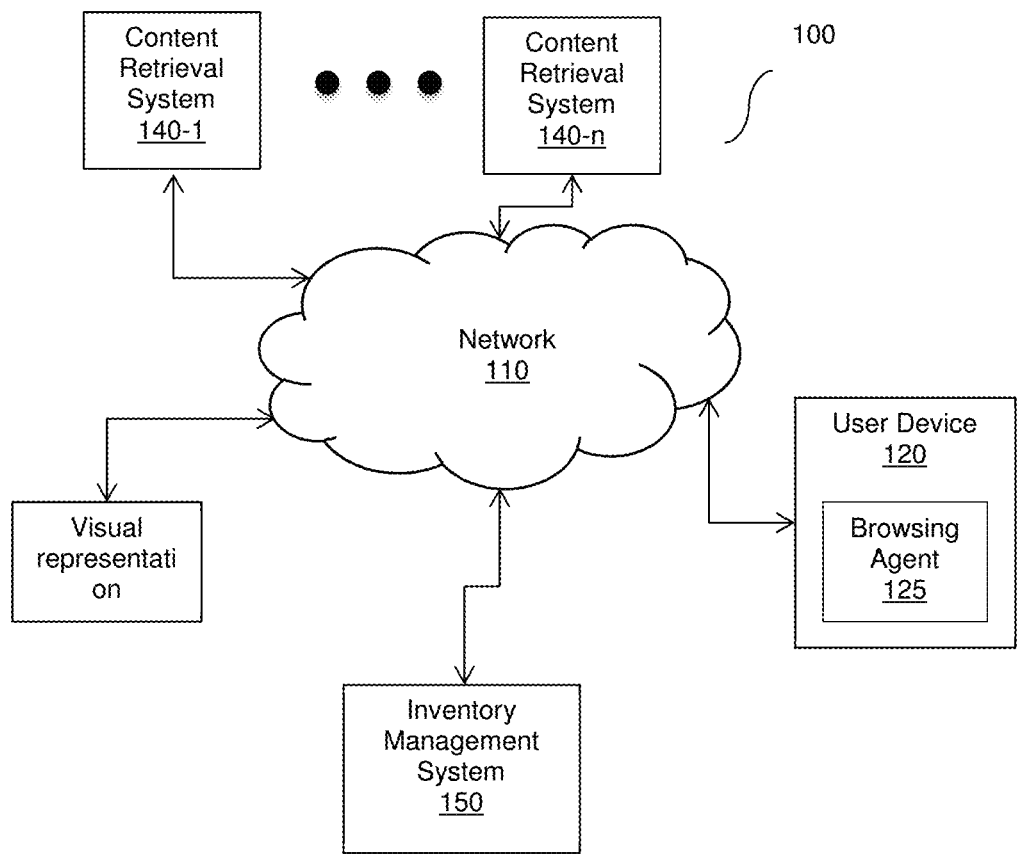
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example network diagram 100 utilized to describe the various disclosed embodiments. The network diagram 100 includes a network 110, a user device 120, a visual representation generator 130, a plurality of content retrieval systems 140-1 through 140-*n* (hereinafter referred to individually as a search engine 140 and collectively as search engines 140, merely for simplicity purposes) and an inventory management system 150.

The network 110 may be the Internet, the world-wide-web (WWW), a local area network (LAN), a wide area network (WAN), a metro area network (MAN), and other networks configured to communicate between the elements of the 110. The user device 120 may be a personal computer (PC), a personal digital assistant (PDA), a mobile phone, a smart phone, a tablet computer, a wearable computer device, an e-reader, a game console, or any other device equipped with browsing capabilities. The content retrieval systems 140 may include, but are not limited to, search engines or other sources of content from which content may be retrieved. Alternatively or collectively, the content retrieval systems 140 may include or be communicatively connected to one or more data sources which can be queried or crawled for content.

The user device 120 may further include a browsing agent 125 installed therein. The browsing agent 125 may be, but is not limited to, a mobile application, a virtual application, a web application, a native application, and the like. In certain configurations, the browsing agent 125 can be realized as an add-on or plug-in for a web browser. In other configurations, the browsing agent 125 is a web browser. The user device 120 may receive a user query or otherwise receive a request to display content (e.g., via the browsing agent 125) and to send, to the visual representation generator

130, a request to generate a visual representation of the content to be browsed. The request to generate a visual representation may include, but is not limited to, the user query, the content to be browsed, an identifier of the content to be browsed, or a combination thereof. The user query may include a text query or a voice query. The user query may be submitted through a user gesture, e.g., tapping on a certain image or key word.

In an embodiment, the visual representation generator 130 is configured to receive the request to generate a visual representation and to determine an initial focal point based on the request. The initial focal point includes content to be initially displayed prominently (e.g., before navigation) to the user. Non-limiting examples of prominently displaying the initial focal point include displaying the initial focal point as larger than other content; displaying the initial focal point in a center, top, or other portion of a display; displaying the focal point with at least one prominence marker (e.g., a letter, a number, a symbol, a graphic, a color, etc.); displaying the focal point with a higher brightness or resolution than other content; displaying the focal point using one or more animations (e.g., displaying the focal point as moving up and down); a combination thereof; and the like. For example, if the content to be browsed includes images of a dog, a most recent image of dog may be selected as the initial focal point such that, when the visual representation is initially displayed to the user, the image of the dog is the largest and centermost image appearing on a display (not shown) of the user device 120.

In a further embodiment, determining an initial focal point based on the request may further include pre-processing the user query. Pre-processing the user query may include, but is not limited to, correcting typos, enriching the query with information related to the user (e.g., a browsing history, a current location, etc.), and so on. In another embodiment, the initial focal point may include a web site utilized as a seed for a search. As an example, the initial focal point for a search based on the user query "buy shoes" may be a web site featuring a large variety of shoes.

In an embodiment, the visual representation generator 130 is configured to retrieve content from the retrieval systems 140 based on a focal point. For the first time content is retrieved for the request, the initial focal point is used. The retrieval systems 140 may search using the user query with respect to the focal point. Alternatively or collectively, the visual representation generator 130 may crawl through one or more of the retrieval systems 140 for the content. The retrieved content may include, but is not limited to, search results, content to be displayed, or both.

In another embodiment, the visual representation generator 130 may be configured to query an inventory management system 150 and to receive, from the inventory management system 150, a probability that one or more vendors have a sufficient inventory of a product based on the user query and the focal point. An example implementation for an inventory management system for returning probabilities that vendors have sufficient inventories of product are described further in the above-referenced U.S. patent application Ser. No. 14/940,396 filed on Nov. 13, 2015, assigned to the common assignee, which is hereby incorporated by reference for all that it contains.

In an embodiment, the visual representation generator 130 is further configured to organize the retrieved content. The content may be organized around the focal point. Accordingly, the content, when initially organized, may be organized around the initial focal point. The visual representation generator 130 may be configured to receive user interactions respective of the organized content and to determine a current focal point based on the user interactions. In an embodiment, the content may be organized as points on a sphere and displayed to the user. The sphere may be displayed in a three-dimensional (3D) plane (i.e., using a stereoscopic display) or in a two-dimensional (2D) plane (i.e., such that the sphere appears to be 3D merely via optical illusion).

In another embodiment, the visual representation generator 130 is configured to generate a visual representation including a browsing environment and a plurality of dynamic content elements. Each dynamic content element includes content or representations of content to be browsed. In an embodiment, the focal point includes one of the dynamic content elements.

The browsing environment may include, but is not limited to, images, videos, or other visual illustrations of an environment in which the content is to be browsed. The visual illustrations may be two-dimensional, three-dimensional, and the like. The browsing environment may include visual illustrations of a real location (e.g., a store or other physical location), of a non-real location (e.g., a cartoon library, a virtual store, an imaginary combination of real stores, or any other virtual or fictional location), or any other visual illustrations (for example, a visual illustration showing text, objects, people, animals, solid colors, patterns, combinations thereof, and the like).

In an embodiment, the browsing environment is rendered at the beginning of browsing and static (i.e., remain the same as content is browsed) or dynamic (i.e., re-rendered or otherwise updated as content is browsed). As a non-limiting example, the browsing environment may include images showing a physical store in which products represented by the dynamic content elements are sold, where the images are updated to show different areas in the physical store as the user "moves" through the store by navigating among dynamic elements representing products sold in the store. As another non-limiting example, the browsing environment may include a static image illustrating a library, where the static image remains constant as the user navigates among dynamic elements representing books in the library.

The dynamic content elements may be updated and rendered in real-time as the user browses. Updating the dynamic content elements may include, but is not limited to, changing the content to be displayed, updating information related to each content (e.g., updating a value for a number of items in stock when the content represents a purchasable product), dynamically organizing the dynamic content elements, a combination thereof, and the like. Dynamic organization of the dynamic content elements may be based on one or more dynamic organization rules. Such dynamic organization rules may be based on, but are not limited to, amount of inventory in stock for store products (e.g., a current inventory or projected future inventory), popularity of content (e.g., content which is trending may be organized closer to the focal point), relevance to user interests (e.g., content that is more relevant to current user interests may be organized closer to the focal point), combinations thereof, and the like.

As a non-limiting example for a visual representation including a browsing environment and a plurality of dynamic content elements, the visual representation may represent an online store, with the browsing environment showing a storefront image and the dynamic content elements including product listings. The product listings may include, but are not limited to, text (e.g., product descriptions, product information such as inventory and price, etc.), images (e.g., images of the product), videos (e.g., videos demonstrating the product), sound (e.g., sound including customer reviews), combinations thereof, and the like. The dynamic content elements are rendered in real-time as the user browses. The rendered dynamic content elements include information related to the product listings, where the information includes at least a current or projected inventory. The rendered dynamic content elements are organized in real-time based on dynamic organization rules. The dynamic organization rules are based on inventory such that lower inventory items or items having minimal inventory (e.g., having an amount of inventory below a predetermined threshold) are organized closer to the focal point. Such organization may be useful for, e.g., incentivizing users to buy lower stock products. As the user browses, inventory information for the product listings is updated and the dynamic content elements are organized accordingly.

Figure 3:
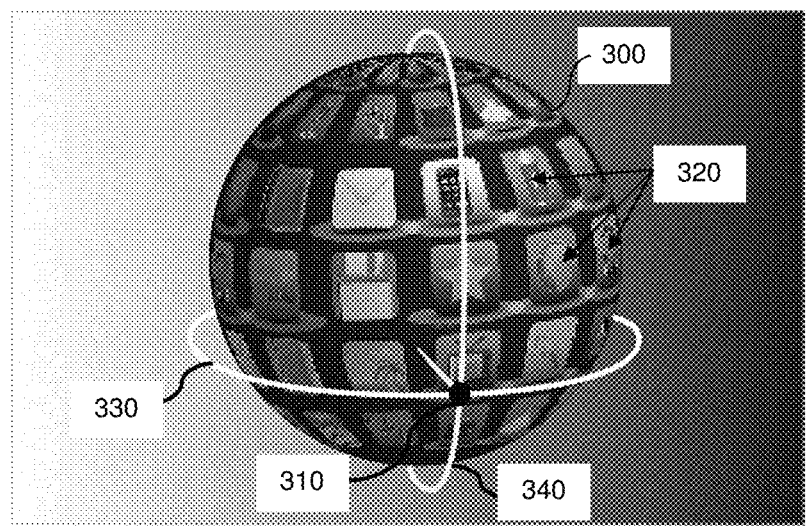
FIG. 3 is a screenshot illustrating a spherical organization of content.

FIG. 3 shows an example screenshot illustrating a content sphere 300 which is a spherical visual representation of content. The content sphere 300 is organized around a focal point 310. A plurality of images 320 act as points on the sphere representing content. If the focal point changes, the sphere may be rotated to show a different icon as the focal point. A horizontal axis 330 and a vertical axis 340 visually represent potential directions for changing the focal point to view additional content. For example, the user may gesture horizontally to view content oriented along the horizontal axis 330 and may gesture vertically to view content oriented along the vertical axis 340. It should be note that the images 320 may include icons, textual information, widgets, or any other representation or presentation of the displayed content.

The axes 330 and 340 may be adaptably changed as the user selects new content to be the focal point 310 (e.g., by providing user gestures with respect to one of the images 320), as the user rotates the content sphere 300 (e.g., by providing user gestures with respect to the axes 330 and 340), or both. That is, the visual representation generator 130 is configured to predict (through a learning process), the user's path as the user browses via the presented content sphere 300. As an example, if the focal point 310 includes content related to President Bill Clinton, then rotating the content sphere 300 down along the vertical axis 340 may return results related to the US in the 1990's. On the other hand, rotating the content sphere 310 in the right direction along the horizontal axis 330 may return results related to the Democratic party.

Further, as the content of the focal point 310 changes, the related content available via the axes 330 and 340 may change. Thus, axes of interest may be initially predefined, and then adaptably modified. For example, when the focal point 310 is changed to content related to President Obama by rotating the content sphere 300 along the horizontal axis 330, the content available by rotating along the vertical access 340 may become content related to the US in the 2000's.

It should be appreciated that, by adaptably changing the content along the axes of interest (e.g., the axes 330 and 340), the user may be provided with an endless browsing experience. Further, each content item can be presented in different virtual settings. As an example, a lipstick may be presented in the context of cosmetics and then again as part of a Halloween costume, thus continually experiencing new browsing experience.

In a further embodiment, the display may include a graphical user interface for receiving user interactions with respect to the spherically organized search results. As a non-limiting example, the search results for the query "alcoholic drinks" may be displayed as points on the content sphere 300 based on an initial focal point of a website featuring beer. Results from the initial focal point may be initially displayed as the focal point 310. When a user rotates (e.g., swipes or moves) a mouse icon horizontally across the sphere 300, a new focal point 310 may be determined as a web site for another type of alcoholic beverage (e.g., wine, vodka, and so on). When a user swipes or moves a mouse icon vertically across the content sphere 300, a new focal point may be determined as a web site for a particular brand of beer.

It should be noted that the example content sphere 300 shown in FIG. 3 is merely an example of a visual representation and is not limiting on the disclosed embodiments. In particular, the content sphere 300 is shown as having two axes merely for illustrative purposes. Different numbers of axes may be equally utilized, any of which may be, but are not necessarily, horizontal or vertical. For example, diagonal axes may be utilized in addition to or instead of horizontal and vertical axes. Further, the axes may be three-dimensional without departing from the scope of the disclosure. For example, the content sphere 300 may be navigated by moving closer or farther away from a center point of the sphere.

It should further be noted that the content may be shown in a shape other than a spherical shape without departing from the scope of the disclosure. It should also be noted that the content sphere 300 is shown as having a solid black background surrounding the images 320 merely as an example illustration. Other browsing environments (e.g., other colors, patterns, static or dynamic images, videos, combinations thereof, etc.) may be equally utilized without departing from the scope of the disclosed environments. For example, the content may be rendered as three-dimensional representations of shelves and aisles of a real store, where the view of the shelves and aisles is updated as the user browses through images of products in the store.

Figure 2:
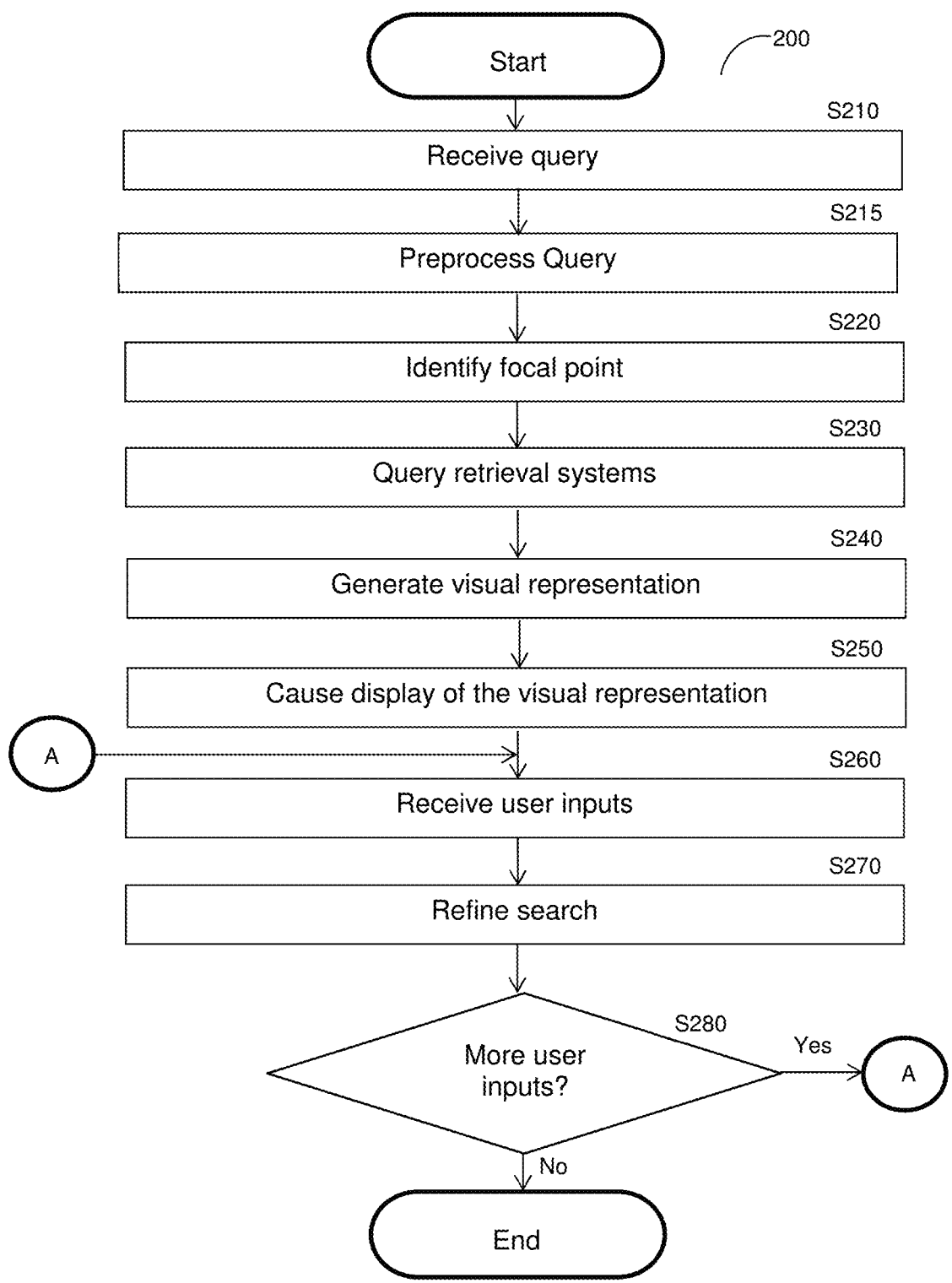
FIG. 2 is a flowchart illustrating a method for organizing content according to an embodiment.

FIG. 2 is an example flowchart 200 illustrating a method for refining search results according to an embodiment. In an embodiment, the method may be performed by a visual representation generator (e.g., the visual representation generator 130, FIG. 1). The method may be utilized to adaptively update visual representations of search results (e.g., search results displayed as the content sphere 300, FIG. 3).

At S210, a query by a user of a user device is received. The query may be received in the form of text, multimedia content, and so on. The query may be a textual query or a voice query.

At optional S215, the query may be preprocessed by, e.g., correcting typos, enriching the query with user information, and so on.

At S220, a focal point is determined based on the received query. The focal point may include a web site to be utilized as a seed for a search based on the query. The determination may include identifying one or more web sites related to the user query. The seed web site may be selected from among the identified web sites based on, e.g., relative validity of the sites (e.g., numbers of legitimate clicks or presence of malware). For example, a user query for "cheese" may result in identification of web sites related to grocery stores, restaurants, and so on. The seed website may be utilized as the initial focal point for the query such that content related to the seed website is displayed as the focal point prior to user interactions with respect to the visual representation.

At S230, at least one retrieval system is queried with respect to the received user query to retrieve search results. The focal point is further sent to the retrieval systems as a seed for the search. The retrieval systems may include, but are not limited to, search engines, inventory management systems, and other systems capable of retrieving content respective of queries.

In an embodiment, S230 may further include querying at least one inventory management system for probabilities that products indicated in the search results are in stock at particular merchants. The probabilities may be utilized to, e.g., enrich or otherwise provide more information related to the search results. As a non-limiting example, the probability that a brand of shoe is in stock at a particular merchant may be provided in, e.g., a top left corner of an icon representing content related to the brand of shoe sold by the merchant.

At S240, a visual representation is generated based on the search results and the identified focal point. The visual representation may include points representing particular search results (e.g., a particular web page or a portion thereof). The visual representation may include a graphical user interface for receiving user interactions respective of the search results. In an embodiment, S240 includes organizing the search results respective of the focal point. In a further embodiment, the search results may be organized graphically. In yet a further embodiment, the organization may include assigning the search results to points on, e.g., a sphere or other geometrical organization of the search results.

In another embodiment, the generated visual representation may include a browsing environment and a plurality of dynamic content elements. The browsing environment may include, but is not limited to, images, videos, or other visual illustrations of an environment (e.g., a real location, a virtual location, background colors and patterns, etc.) in which content is to be browsed. The browsing environment may be static, or may be dynamically updated in real-time as a user browses the content. The dynamic content elements are updated in real-time as a user browses the content. The dynamic content elements may be further reorganized in real-time based on the user browsing. As a non-limiting example, the generated visual representation may include a static storefront image and a plurality of dynamic elements updated in real-time to show product listings with current inventories, where the dynamic elements are organized such that lower inventory content items are closer to the focal point that higher inventory items.

At S250, the visual representation of the organized search results is caused to be displayed to the user. In an embodiment, S250 may include sending the visual representation to a user device (e.g., the user device 120, FIG. 1). In an embodiment, the visual representation may be displayed as a three-dimensional (3D) representation of the search results.

At S260, at least one user input is received with respect to the displayed visual representation. The user inputs may include, but are not limited to, key strokes, mouse clicks, mouse movements, user gestures on a touch screen (e.g., tapping, swiping), movement of a user device (as detected by, e.g., an accelerometer, a global positioning system (GPS), a gyroscope, etc.), voice commands, and the like.

At S270, based on the received user inputs, the search results are refined. In an embodiment, S270 may include determining a current focal point based on the user inputs and the visual representation. In a further embodiment, S270 includes updating the visual representation using a website of the new focal point as a seed for the search.

At S280, it is determined whether additional user inputs have been received and, if so, execution continues with S260; otherwise, execution terminates. In another embodiment, S280 includes determining if the additional user inputs include a new or modified query and, if so, execution may continue with S210.

Figure 4:
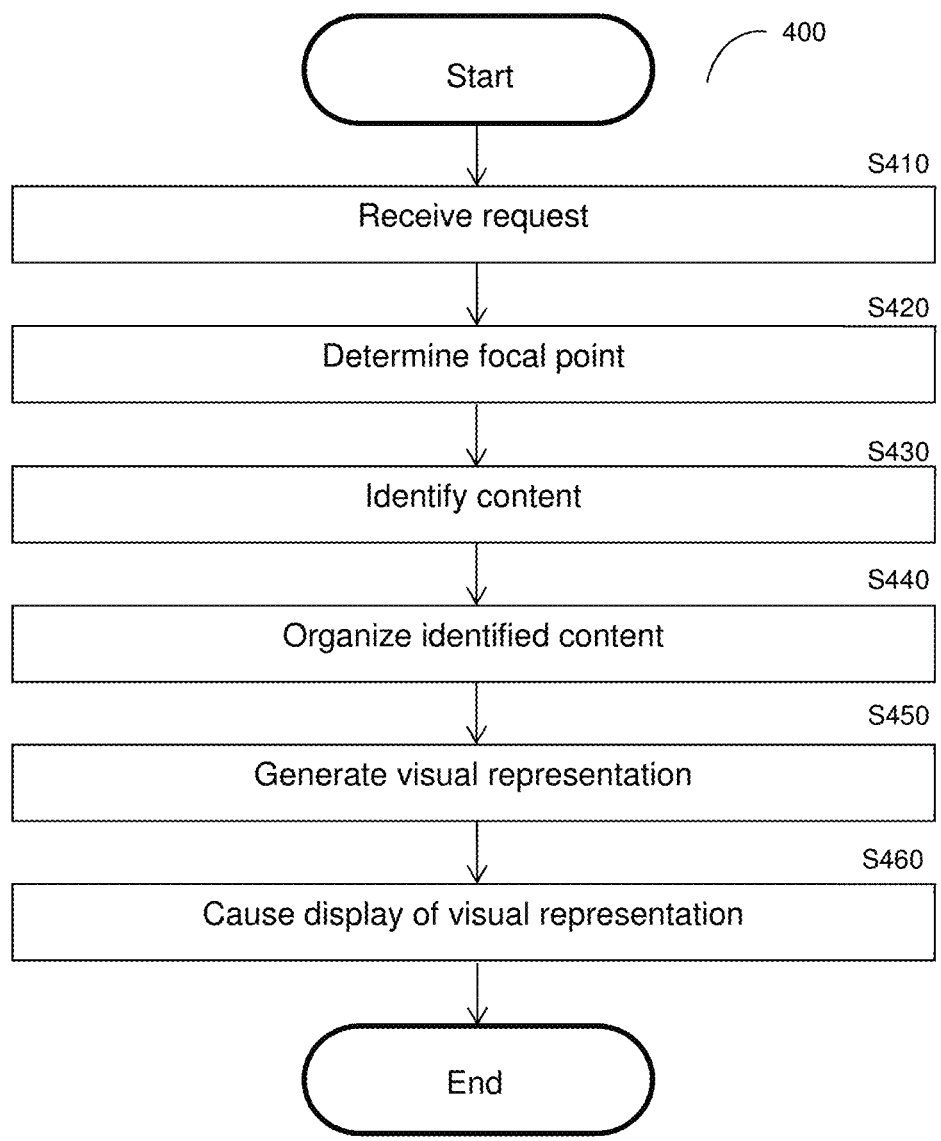
FIG. 4 is a flowchart illustrating a method for displaying content that may be intuitively browsed according to an embodiment.

FIG. 4 is an example flowchart 400 illustrating a method for displaying content for intuitive browsing according to an embodiment. In an embodiment, the method may be performed by a visual representation generator (e.g., the visual representation generator 130). The visual representation generator may query, crawl, or otherwise obtain content from content retrieval systems (e.g., the content retrieval systems 140). In another embodiment, the method may be performed by a user device (e.g., the user device 120) based on locally available content, retrieved content, or both.

At S410, a request to display content is received. The request may include, but is not limited to, a query, content to be displayed, an identifier of content to be displayed, an identifier of at least one source of content, a combination thereof, and so on.

At S420, based on the request, a focal point is determined. The focal point may be determined based on, but not limited to, the query, the content to be displayed, the designated content sources, information about a user (e.g., a user profile, a browsing history, demographic information, etc.), combinations thereof, and so on. The focal point may be, but is not limited to, content, a source of content, a category or other grouping of content, a representation thereof, and so on. In an embodiment, the focal point may be related to a website to be used as a seed for a search with respect to the query (e.g., a web crawl).

At S430, content to be browsed with respect to the focal point is identified. The identified content may be related to the focal point. The identified content may be stored locally, or may be retrieved from at least one data source (e.g., the content retrieval systems 140 or the inventory management system 150, FIG. 1) As examples, the identified content may include, but is not limited to, content from the same or similar web sources, content that is contextually related to content of the focal point (e.g., belonging to a same category or otherwise sharing common or related information), and so on. Similarity of content may be based on matching the content. In an embodiment, content and sources may be similar if they match above a predefined threshold.

At S440, the identified content is organized with respect to the focal point. In an embodiment, the organization may be based on one or more axes. The axes may represent different facets of the determined content such as, but not limited to, creator (e.g., an artist, author, director, editor, publisher, etc.), geographic location, category of subject matter, type of content, genre, time of publication, and any other point of similarity among content. As a non-limiting example, content related to a focal point of a particular movie may be organized based on one or more axes such as, but not limited to, movies featuring the same actor(s), movies by the same director, movies by the same publisher, movies within the same genre, movies originating in the same country, movies from a particular decade or year, other media related to the movie (e.g., a television show tying into the movie) merchandise or other products related to the movie, and so on.

At S450, a visual representation of the organized content is generated. The visual representation may include points, each point representing at least a portion of the identified content. The visual representation may include a graphical user interface for receiving user interactions respective of the search results. In an embodiment, the visual representation may be spherical, may allow a user to change axes by gesturing horizontally, and may allow a user to change content within an axis by gesturing vertically. In another embodiment, the visual representation may be three-dimensional.

At S460, the generated visual representation is caused to be displayed on a user device. In an embodiment, S460 includes sending the visual representation to the user device. In an embodiment, the visual representation may be updated when, e.g., an amount of content that has been displayed is above a predefined threshold, a number of user interactions is above a predefined threshold, a refined or new query is received, and the like.

As a non-limiting example, a request to display content is received. The request includes the query "the thinker." A focal point including an image of the sculpture "The Thinker" by Auguste Rodin is determined. Content related to "The Thinker," including various sculptural and artistic works, is determined using the website in which the image is shown as a seed for a search. The content is organized spherically based on axes including other famous sculptures, sculptures by French sculptors, art by Auguste Rodin, works featuring "The Thinker," sculptures created in the late 1800s, and versions of "The Thinker" made from different materials. A visual representation of the spherically organized content is generated and caused to be displayed on a user device.

Figure 5:
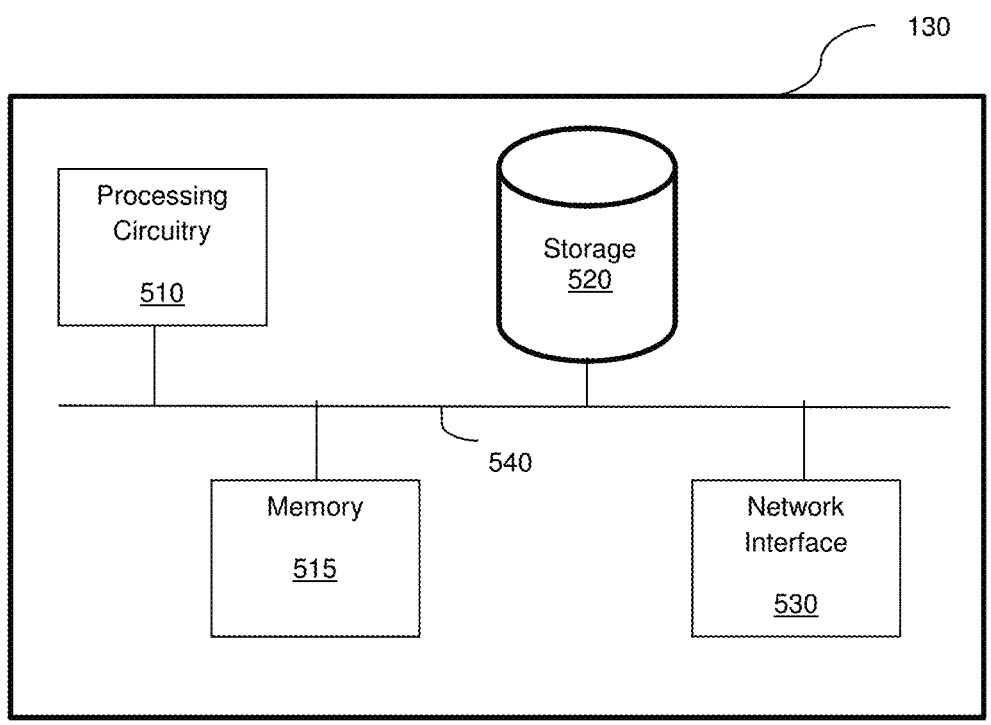
FIG. 5 is a schematic diagram of a visual representation generator according to an embodiment.

FIG. 5 is an example schematic diagram of the visual representation generator 130 according to an embodiment. The visual representation generator 130 includes a processing circuitry 510 coupled to a memory 515, a storage 520, and a network interface 530. In another embodiment, the components of the visual representation generator 130 may be communicatively connected via a bus 540.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to perform generation of visual representations of content for intuitive browsing, as discussed hereinabove.

The storage 520 may be magnetic storage, optical storage, and the like, and may be realized, for example, as flash memory or other memory technology, CD-ROM, Digital Versatile Disks (DVDs), or any other medium which can be used to store the desired information.

The network interface 530 allows the visual representation generator 130 to communicate with the user device 120, the content retrieval systems 140, the inventory management system 150, or a combination of, for the purpose of, for example, obtaining requests, obtaining content, obtaining probabilities, querying, sending visual representations, combinations thereof, and the like.

It should be understood that the embodiments described herein are not limited to the specific architecture illustrated in FIG. 5, and other architectures may be equally used without departing from the scope of the disclosed embodiments.

It should be noted that various embodiments described herein are discussed with respect to content from search results merely for simplicity purposes and without limitation on the disclosed embodiments. Other content, including content preexisting on a device, content available via a storage or data source, and the like, may be displayed and browsed without departing from the scope of the disclosure.

It should be further noted that the embodiments described herein are discussed with respect to a spherical representation of content merely for simplicity purposes and without limitation on the disclosed embodiments. Other geometrical representations may be utilized with points on the geometric figures representing search results without departing from the scope of the disclosure. For example, the search results may be organized as points on different sides a cube such that user interactions may cause the displayed cube side to change, thereby changing the search results being displayed.

It should also be noted that various examples for changing content are provided merely for the sake of illustration and without limitation on the disclosed embodiments. Content may be organized in other ways without departing from the scope of the disclosure.

It should be further noted that the content may be organized based on the subject matter of the content. For example, the content may be organized differently for queries for restaurants than for requests to display documents on a user device.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for intuitive content browsing, comprising:
determining, based on a request to browse content, an initial focal point for a visual representation of the content, wherein the initial focal point represents a content item to be initially displayed prominently;
identifying, based on the request and the determined initial focal point, the content to be browsed;
generating, based on the identified content and the focal point, a visual representation of the identified content, wherein the generated visual representation includes the identified content organized with respect to the initial focal point, wherein generating the visual representation further includes predicting a user path as the user browses the visual representation, and wherein the display prominence of the content item to be initially displayed prominently is implemented by at least one distinct emphasizing visual appearance characteristic other than its location within the representation; and
sending, to a user device, the generated visual representation for display, wherein the identified content is browsed via the displayed visual representation with respect to the focal point.

2. The method of claim 1, wherein the generated visual representation includes at least one axis, wherein the generated visual representation is browsed along each of the at least one axis.

3. The method of claim 2, wherein the browsing of the displayed visual representation includes selecting, based on at least one user input, a new focal point, wherein the displayed visual representation is updated with respect to the new focal point.

4. The method of claim 1, wherein the request includes a query, wherein the content to be browsed includes at least search results.

5. The method of claim 4, wherein the determined focal point includes content of a web site, wherein identifying the content to be browsed further comprises:

searching, based on the query, in at least one content retrieval system for the content to be browsed, wherein the web site is utilized as a seed for the search.

6. The method of claim 4, further comprising:
querying at least one inventory management system for probabilities that products indicated in the search results are available from at least one merchant.

7. The method of claim 4, further comprising:
determining, based on at least one user input, a new focal point, the new focal point including content of a web site; and
updating the visual representation based on the new focal point.

8. The method of claim 1, wherein the generated visual representation includes a browsing environment and at least one dynamic content element, the browsing environment including at least one visual illustration, each dynamic content element including one of the content to be browsed, wherein the at least one dynamic content element is updated in real-time as the identified content is browsed.

9. The method of claim 8, wherein the browsing environment is updated in real-time as the identified content is browsed.

10. A non-transitory computer readable medium having stored thereon instructions for causing a processing circuitry to perform a process, the process comprising:
determining, based on a request to browse content, an initial focal point for a visual representation of the content, wherein the initial focal point represents a content item to be initially displayed prominently;
identifying, based on the request and the determined initial focal point, the content to be browsed;
generating, based on the identified content and the focal point, a visual representation of the identified content, wherein the generated visual representation includes the identified content organized with respect to the initial focal point, wherein generating the visual representation further includes predicting a user path as the user browses the visual representation, and wherein the display prominence of the content item to be initially displayed prominently is implemented by at least one distinct emphasizing visual appearance characteristic other than its location within the representation; and
sending, to a user device, the generated visual representation for display, wherein the identified content is browsed via the displayed visual representation with respect to the focal point.

11. A system for intuitive content browsing, comprising:
a processing circuitry; and
a memory, the memory containing instructions that, when executed by the processing circuitry, configure the system to:
determine, based on a request to browse content, an initial focal point for a visual representation of the content, wherein the initial focal point represents a content item to be initially displayed prominently;
identify, based on the request and the determined initial focal point, the content to be browsed;
generate, based on the identified content and the focal point, a visual representation of the identified content, wherein the generated visual representation includes the identified content organized with respect to the initial focal point, wherein generating the visual representation further includes predicting a user path as the user browses the visual representation, and wherein the display prominence of the content item to be initially displayed prominently is implemented by at least one distinct emphasizing visual appearance characteristic other than its location within the representation; and send, to a user device, the generated visual representation for display, wherein the identified content is browsed via the displayed visual representation with respect to the focal point.

12. The system of claim 11, wherein the generated visual representation includes at least one axis, wherein the generated visual representation is browsed along each of the at least one axis.

13. The system of claim 12, wherein the browsing of the displayed visual representation includes selecting, based on at least one user input, a new focal point, wherein the displayed visual representation is updated with respect to the new focal point.

14. The system of claim 11, wherein the request includes a query, wherein the content to be browsed includes at least search results.

15. The system of claim 14, wherein the determined focal point includes content of a web site, wherein the system is further configured to:

search, based on the query, in at least one content retrieval system for the content to be browsed, wherein the web site is utilized as a seed for the search.

16. The system of claim 14, wherein the system is further configured to:

query at least one inventory management system for probabilities that products indicated in the search results are available from at least one merchant.

17. The system of claim 14, wherein the system is further configured to:

determine, based on at least one user input, a new focal point, the new focal point including content of a web site; and update the visual representation based on the new focal point.

18. The system of claim 11, wherein the generated visual representation includes a browsing environment and at least one dynamic content element, the browsing environment including at least one visual illustration, each dynamic content element including one of the content to be browsed, wherein the at least one dynamic content element is updated in real-time as the identified content is browsed.

19. The system of claim 18, wherein the browsing environment is updated in real-time as the identified content is browsed.

* * * * *